(12) United States Patent
Ishihara

(10) Patent No.: US 6,812,173 B2
(45) Date of Patent: Nov. 2, 2004

(54) LIGHTING GLASS AND COLORED GLASS BULBS, AND MANUFACTURING METHOD THEREOF

(75) Inventor: Yoshihisa Ishihara, Osaka (JP)

(73) Assignee: Nipro Corporation, Osaka (JP)

( * ) Notice: Subject to any disclaimer, the term of this patent is extended or adjusted under 35 U.S.C. 154(b) by 154 days.

(21) Appl. No.: 10/305,140

(22) Filed: Nov. 27, 2002

(65) Prior Publication Data

US 2003/0121916 A1 Jul. 3, 2003

(30) Foreign Application Priority Data

Nov. 28, 2001 (JP) ........................................ 2001-362553

(51) Int. Cl.[7] ........................... C03C 3/085; C03B 23/07
(52) U.S. Cl. ............................ 501/69; 220/2.2; 65/103; 65/108; 501/70
(58) Field of Search ...................... 501/69, 70; 220/2.2; 65/103, 108

(56) References Cited

U.S. PATENT DOCUMENTS 4,106,946 A * 8/1978 Ritze ........................... 501/55

* cited by examiner

Primary Examiner—Karl Group
(74) Attorney, Agent, or Firm—Kubovcik & Kubovcik

(57) ABSTRACT

Lighting glass containing 0.3 to 1.0% by weight of Sb as $Sb_2O_3$ and 0.5 to 1.0% by weight of S as $SO_3$ in a $SiO_2$—$Al_2O_3$—$R^1O$—$R^2{}_2O$-based glass (where $R^1$ represents Ca, Sr, Mg and Ba and $R^2$ represents Na, K and Li) in which colloids comprising $SbS_2$ and/or $Sb_2S_3$ are generated in the glass.

11 Claims, No Drawings

LIGHTING GLASS AND COLORED GLASS BULBS, AND MANUFACTURING METHOD THEREOF

TECHNICAL FIELD OF THE INVENTION

This invention concerns lighting glass, i.e., glass for bulbs for automobiles and bulbs for household use, capable of transmitting light of a predetermined chromaticity (orange to red) required for directional indicator lamps or tail/stop lamps, for example, in automobiles, and which does not contain deleterious ingredients such as lead, cadmium, selenium, chromium and arsenic, and a colored glass bulb using the above-mentioned glass, as well as a manufacturing method thereof.

BACKGROUND OF THE INVENTION

It is required for lamps and lamp units used, for example, in direction indicators or tail/stop lamps of automobiles that they have specified chromaticity (orange and red) determined in accordance with standards of the International Electric Standard Conference (IEC) or Japanese Industrial Standards (JIS). For example, as lamp units for automobile direction indicators, those transmitting light having predetermined chromaticity by the combination of bulbs using colorless transparent glass and plastic covers of orange color have been adopted so far. In the same manner, those comprising bulbs using colorless transparent glass and plastic covers of red color in combination have also been adopted for tail/stop lamp units. However, the groups of lamp units located at front and rear portions of automobiles also require transparent plastic covers for head lights and back lights in addition to covers of red and orange colors, and the step of assembling them is complicated and they are expensive in view of the number of parts.

In view of the above, a bulb using glass which itself is colored orange (colored glass) or a bulb in which a orange coating agent is coated on the surface of the glass bulb in combination with a colorless transparent lens cover (lamp unit) has been adopted recently for lamp units of direction indicators. Further, also in tail/stop lamp units, lamp units using a light emitting diode that emits red color as a light source in combination with a colorless transparent plastic cover have been recently provided.

Thus, the number of parts is decreased and the cost is reduced, particularly, with respect to direction indicator lamp units. In addition, such a countermeasure has been evaluated also in view of design in situations where the types of automobiles become more versatile. However, orange colored glass used currently for lamps for use in direction indicators contains cadmium or selenium which is designated as an environment hazardous substance, for which saving or inhibition of use has taken place all over the world. Further, electric bulbs coated with coating agents on glass sometimes contain a deleterious Pb—Cr (lead-chromium) colorant in the coating agent. Further, they also involve problems of color speckles caused by coating speckles in the coating step, thermal discoloration and peeling. Further, while recycling is possible for colorless transparent glass or colored glass by nature, it is difficult when the coating is applied.

On the other hand, in the tail/stop lamp units, in a case where colorless transparent plastic covers are used for red emitting diodes, since more than ten of the light emitting diodes are required per one lamp, this increases the number of parts and makes the assembling step further complicated, and results in the problem that the cost is increased. Further, in a case of using colored glass, a red colored glass using cadmium-selenium for the colorant may be considered but it is not preferable in view of the same environmental concerns as described above. Further, while copper may sometimes be used as a colorant, since it requires an extended heat treatment after the molding of the bulb in order to obtain a predetermined chromaticity, such bulbs have not yet been popularized generally in view of availability and cost and only a limited number of them is marketed at present. Further, while electric bulbs in which a coating agent is coated on glass by the same method as in the direction indicators are marketed only limitedly, they not only involve the same problems but also can not satisfy the standards for the red color required for automobile bulbs specified according to JIS or the like.

While it has been known so far that red colored glass can be obtained by generating a colloid comprising $SbS_2$ or $SbS_3$ in glass, lighting glass using such colored glass has not yet been put to practical use.

One of the reasons is that either an excessive or insufficient amount of Sb in the glass causes a problem of turbidity and no appropriate content has yet been determined.

As another reason, only glass from transparent to yellow can be obtained by rapid cooling from a temperature greatly exceeding the softening point (900 to 1000° C.) usually used in the molding of a glass tube or bulb, so that a re-heating treatment has to be applied in order to obtain red or orange colored glass. However, since the coloring temperature range upon re-heating treatment is not below the softening point, it also results in a problem of deformation of molded glass.

SUMMARY OF THE INVENTION

The present invention has been accomplished in view of the foregoing situations and provides lighting glass which does not contain deleterious ingredients such as lead, cadmium, selenium, chromium and arsenic and which can be manufactured in a relatively short period of time, and a colored glass bulb, and a manufacturing method thereof.

As a result of an earnest study, the present inventors have found that lighting glass of various warm colors can be obtained by incorporating an appropriate amount of Sb and, further, an appropriate amount of S in glass and generating a colloid comprising $SbS_2$ and/or $Sb_2S_3$.

Further, it has been found that lighting glass of various warm colors can be obtained by incorporating appropriate amounts of Sb and S into glass and applying a re-heating treatment while controlling the temperature and the time thereby generating a colloid comprising $SbS_2$ and/or $Sb_2S_3$. In the re-heating treatment, it has been found that red lighting glass is obtained when rapid cooling is conducted after the re-heating and orange lighting glass can be obtained when cooling at a predetermined temperature gradient without rapid cooling is conducted.

Further, it has also been found that with respect to lighting glass to which a re-heating treatment has been applied for obtaining the red coloration, even when the color is changed to a red-orange color (an intermediate color between red and orange, specified according to IEC standards or JIS) by heat (flame) in a subsequent fabrication, it can easily regain a desired red color with no deformation by an additional re-heating treatment at a temperature lower than the softening point of the glass and at a temperature lower than that used for the original re-heating treatment.

That is, this invention provides a lighting glass in which 0.3 to 1.0% by weight of Sb calculated as $Sb_2O_3$ and 0.5 to 1.0% by weight of S calculated as $SO_3$ are contained in a $SiO_2$—$Al_2O_3$—$R^1O$—$R^2{}_2O$-based glass (where $R^1$ represents Ca, Sr, Mg and Ba and $R^2$ represents Na, K and Li), and a colloid comprising $SbS_2$ and/or $Sb_2S_3$ is generated in the glass.

The $SiO_2$—$Al_2O_3$—$R^1O$—$R^2{}_2O$-based glass (where $R^1$ represents Ca, Sr, Mg and Ba and $R^2$ represents Na, K and Li) preferably has a composition comprising on a weight % basis, $SiO_2$: 60 to 75%, $Al_2O_3$: 1 to 5%, $B_2O_3$: 0 to 3%, BaO: 0 to 10%, SrO: 0 to 12%, CaO: 0 to 18%, MgO: 0 to 5%, $Na_2O$: 1 to 17%, $K_2O$: 1 to 17% and $Li_2O$: 0 to 3%. The lighting glass according to this invention can be used suitably for colored glass bulbs.

Further, this invention provides a method of manufacturing lighting glass of a $SiO_2$—$Al_2O_3$—$R^1O$—$R^2{}_2O$-based glass (where $R^1$ represents Ca, Sr, Mg and Ba and $R^2$ represents Na, K and Li) in which 0.3 to 1.0% by weight of Sb calculated as $Sb_2O_3$ and 0.5 to 1.0% by weight of S calculated as $SO_3$ are contained, wherein a re-heating treatment is applied after molding by heat melting. The $SiO_2$—$Al_2O_3$—$R^1O$—$R^2{}_2O$-based glass (where $R^1$ represents Ca, Sr, Mg and Ba and $R^2$ represents Na, K and Li) preferably has a composition comprising on a weight % basis, $SiO_2$: 60 to 75%, $Al_2O_3$: 1 to 5%, $B_2O_3$: 0 to 3%, BaO: 0 to 10%, SrO: 0 to 12%, CaO: 0 to 18%, MgO: 0 to 5%, $Na_2O$: 1 to 17%, $K_2O$: 1 to 17% and $Li_2O$: 0 to 3%. Further, the re-heating treatment is conducted, preferably, at a temperature of from 650 to 750° C. More specifically, it is preferred to apply the re-heating treatment to the molded glass at 650 to 700° C. for 3 to 30 min followed by rapid cooling by leaving the re-heated glass at a normal temperature or applying a re-heating treatment at 680 to 700° C. for 1 to 3 min and then gradually cooling down to a normal temperature at a rate of 3 to 10 sec per 1° C. Heating times of greater than 30 min are possible but are not practical.

Further, this invention concerns a method of manufacturing lighting glass, wherein after the re-heating treatment, an additional re-heating treatment is applied at a temperature lower than the temperature for the original re-heating. The temperature for the additional re-heating treatment is preferably 550 to 600° C.

The manufacturing method of lighting glass according to this invention can be used suitably to manufacture colored glass bulbs.

DETAILED DESCRIPTION OF THE INVENTION

The terminology "lighting glass" as used herein means glass for bulbs for automobiles and bulbs for household use.

Rapid cooling as used herein means cooling at normal temperature (i.e., 20 to 30° C. and gradual cooling means lowering the temperature at a rate of 3 to 10 sec per 1° C.

In this invention, the $SiO_2$—$Al_2O_3$—$R^1O$—$R^2{}_2O$-based glass (where $R^1$ represents Ca, Sr, Mg and Ba and $R^2$ represents Na, K and Li) is a $SiO_2$—$Al_2O_3$—$R^1O$—$R^2{}_2O$-based glass generally used as a basic glass for lighting glass.

It is necessary that the lighting glass according to the present invention has the following characteristics.
(1) The forming temperature is low such that it can be easily formed into bulbs or electric lamps.
(2) The volume resistivity is high in order to obtain an excellent insulative property.
(3) The expansion coefficient is about 90 to $100 \times 10^{-7}$/° C. (30 to 380° C.) which approximates that of a Dumet wire in order to be suitable for sealing with the Dumet wire.
(4) It does not contain lead, cadmium, selenium, chromium, arsenic and the like with a view point of avoiding environmental problems.

In order to satisfy the four characteristics described above, a suitable compositional range of the lighting glass as a basic glass comprises, on a weight % basis, $SiO_2$: 60 to 75%, $Al_2O_3$: 1 to 5%, $B_2O_3$: 0 to 3%, BaO: 0 to 10%, SrO: 0 to 12%, CaO: 0 to 18%, MgO: 0 to 5%, $Na_2O$: 1 to 17%, $K_2O$: 1 to 17% and $Li_2O$: 0 to 3%. Silica sand as the raw material for $SiO_2$ contains 0 to 0.10% of $Fe_2O_3$.

$SiO_2$ is a main material for the glass of this system, and processing, volume resistivity and water resistance of the glass tend to be lowered when the amount is less than 60%, while melting and processing of the glass tend to be difficult when the amount is more than 75%.

$Al_2O_3$ has an effect of stabilizing the glass by intrusion into the silica network structure and enhancing chemical durability but the effects can not be obtained if the amount is less than 1%, while the softening point is increased making it difficult for melting when the amount is more than 5%.

$B_2O_3$ is network-former by itself and has an effect of improving the melting processability and water resistance while scarcely changing the volume resistivity of the glass. However, when the amount is more than 3%, evaporation during melting is increased with a tendency to attack the refractory bricks of a melting furnace and material cost is increased.

Alkaline earth metal oxides such as BaO, SrO, CaO and MgO (hereinafter referred to as $R^1O$) have an effect of increasing the volume resistivity, as well as lowering the forming temperature of the glass. However, since they are ingredients which increase the material cost, and to which formation or suppression of devitrification products are attributable, the total amount of $R^1O$ is preferably from 6 to 12% by weight.

Alkali metal oxides such as $Na_2O$, $K_2O$ and $Li_2O$ (hereinafter referred to as $R^2{}_2O$) are contained as network-modifiers and can improve the melting processability by lowering the glass viscosity. They are also important for controlling the glass expansion coefficient. However, as the amount of $R^2{}_2O$ increases, the amount of alkali leached increases to result in a clouding phenomenon on the surface, which is referred to as white weathering, so that care must be taken in controlling the total amount.

For obtaining the desired characteristics, the most effective ingredient is $Li_2O$ but it involves a problem that the material cost is extremely high. $Na_2O$ has an effect of lowering the glass viscosity although the effect is not as remarkable as that of $Li_2O$. However, it is a main cause of white weathering. $K_2O$ somewhat increases viscosity but has a feature of moderating the temperature gradient of the viscosity.

Further, $Na_2O$ and $K_2O$ have an effect of increasing the volume resistivity by a mixed alkali effect although they, individually, have an effect of lowering the volume resistivity.

The content of $Na_2O$, $K_2O$ and $Li_2O$ is determined in view of the foregoing effects, in which the content of $Na_2O$ is 1 to 17%. When it is less than 1%, melting or processing viscosity of the glass increases. When it is more than 17%, the mixed alkali effect is hardly obtained and the expansion coefficient is excessively high. Further, the frequency of occurrence of white weathering is also increased. The content of $K_2O$ is 1 to 17%. The mixed alkali effect is hardly obtained when it is less than 1%, and the expansion coefficient is excessively high when it is more than 17%, which is not preferred. The $Li_2O$ content is 0 to 3%. When it more than 3%, the expansion coefficient is excessively high and the material cost is increased, which is not preferred. The total amount of alkali metal oxides is generally about 15 to 20% by weight.

The lighting glass of this invention contains Sb in addition to the basic glass materials described above. The Sb content in the glass, calculated as $Sb_2O_3$, is 0.3 to 1.0% by weight, preferably, 0.4 to 1.0% by weight and, further preferably, 0.4 to 0.6% by weight. When $Sb_2O_3$ (i.e., Sb is calculated as $Sb_2O_3$) is less than 0.3% by weight, the grains of a colloid comprising $SbS_2$ and/or $Sb_2S_3$ do not grow to a grain size for obtaining a specified red color and do not emit red color. Further, when it is more than 1.0% by weight, the grains of the colloid comprising $SbS_2$ and/or $Sb_2S_3$ grow to a size larger than the grain size for obtaining the specified red color, or the colloidal particles become excessively dense to form a black color or become not transparent.

When glass containing the basic glass materials described above and $SO_3$ and $Sb_2O_3$ (0.3 to 1.0% by weight) is re-heated at 650 to 700° C. for 3 to 30 min and then rapidly cooled at a normal temperature (when left, or cooled, at normal temperature, the temperature is lowered to such a level as to enable hand holding thereof) a red colored glass is obtained. Then, when the $Sb_2O_3$ content is 0.4 to 1.0% by weight, red coloration is obtained even when the glass wall thickness is about 0.4 mm. Further, in a case where the $Sb_2O_3$ content is 0.4 to 0.6% by weight, not only the red but also orange colored glass can be obtained by controlling the amount of $SO_3$ (to be described later) and applying a specified re-heating treatment (heating at about 680 to 700° C. followed by gradual cooling). In the present invention, since the oxide $Sb_2O_3$ is detected upon analysis, the total amount of Sb in various states in the glass ($Sb_2O_3$, $SbS_2$ and $Sb_2S_3$, etc.) is calculated in terms of $Sb_2O_3$.

Further, the lighting glass according to the present invention further contains S in addition to the basic glass materials described above. The S content in the glass, calculated as $SO_3$, is 0.5 to 1.0% by weight, preferably, 0.6 to 1.0% by weight and, further preferably, 0.6 to 0.8% by weight. When the content of $SO_3$ (i.e., S calculated as) is less than 0.5% by weight, the grains of a colloid comprising $SbS_2$ and/or $Sb_2S_3$ do not grow to a grain size for obtaining a specified red color and do not emit red color. Further, when the $SO_3$ content is more than 1.0% by weight, the grains of the colloid comprising $SbS_2$ and/or $Sb_2S_3$ grow to a size larger than the grain size for obtaining the specified red color, or the colloidal particles become excessively dense to form a black color or become not transparent.

When the glass containing the basic glass materials described above and $Sb_2O_3$ and $SO_3$ as described above (0.5 to 1.0% by weight) is re-heated at 650 to 700° C. for 3 to 30 min and then rapidly cooled at a normal temperature (when left at normal temperature, the temperature is lowered to such a level as to enable hand holding of the glass within 3 to 5 minutes) red colored glass is obtained. Then, when the $SO_3$ content is 0.6 to 1.0% by weight, red coloration is obtained even when the glass wall thickness is about 0.4 mm. Further, in a case where the $SO_3$ content is 0.5 to 0.8% by weight, not only the red but also orange colored glass can be obtained by preparing the amount of $Sb_2O_3$ described above and applying a specified re-heating treatment (heating at about 680 to 700° C. followed by gradual cooling). In this invention, since the oxide $SO_3$ is detected upon analysis, the total amount of S in various states in the glass ($SO_3$, $SbS_2$ $Sb_2S_3$, $Na_2S$ etc.) is calculated in terms of $SO_3$. Further, FeS and $NaFeS_2$ formed from a slight amount of $Fe_2O_3$ contained in the raw materials are also incorporated.

In the manufacture of the lighting glass according to this invention, a reducing agent such as carbon is added in order to maintain a stable reduced state upon glass melting. The addition amount of carbon is from 0.5 to 1.5% by weight in the state of a batch (i.e., raw material). Since an appropriate amount of carbon reacts with oxygen or oxides in the atmosphere or in the raw material upon glass melting and is discharged as $CO_2$, the carbon does not exist in the glass.

Further, as long as the desired characteristics are not deteriorated, a clarifying agent such as fluorides or chlorides and an anti-solarization agent such as $TiO_2$ and $CeO_2$ may also be added in addition to the ingredients described above.

In the manufacture of the lighting glass according to the present invention, in the case of crucible melting, the crucible is placed in the furnace and a batch adjusted so as to have a predetermined composition (starting material) is melted at a temperature of about 1350° C. inside a furnace for 36 to 48 hours by combustion of heavy oils. In a case of tank melting, it is melted at a temperature inside a melter of about 1300° C. for 36 to 72 hours by combustion of heavy oils. Since an inherent oxidizing reaction or scattering occurs to some extent in the melting system described above, the amount of each of the ingredients is increased, and the addition and charging amounts of the reducing agents are set taking such extent into consideration.

Then, a method of manufacturing a colored glass bulb is explained below.

At first, a glass tube having the composition described above is molded. The glass tube is formed by melting a batch adjusted to have a predetermined composition (starting material) and then formed into a tubular shape by a manual drawing process, a Danner process, a Vello process, a down drawing process or an up drawing process. The outer diameter, thickness and length may be of any dimension suitable for a bulb shape. In the method of the invention, the amount of $Sb_2O_3$ and the amount of S or $Na_2SO_4$ required to obtain the desired amounts of $Sb_2O_3$ and $SO_3$ in the glass described above are determined experimentally as would be understood by one of ordinary skill in the art.

In this invention, in a case of using $Sb_2O_3$ as the raw material for Sb and S as the raw material for S, the following reactions take place in the glass.

$$2Sb_2O_3 + 6S + 3C = 2Sb_2S_3 + 3CO_2 \tag{1}$$

or

$$2Sb_2O_3 + 4S + 3C = 2SbS_2 + 3CO_2 \tag{2}$$

However, with respect to S, not only the reactions described above but also the reactions:

$$2Na_2CO_3 + 2S + C = 2Na_2S + 3CO_2 \tag{3}$$

$$Fe_2O_3 + 4S + 3C = 4FeS + 3CO_2 \tag{4}$$

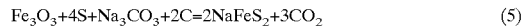
$$Fe_3O_3 + 4S + Na_3CO_3 + 2C = 2NaFeS_2 + 3CO_2 \tag{5}$$

may take place.

Further, in a case of using $Na_2SO_4$ as the material for S the following reaction takes place in the glass:

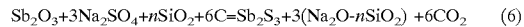
$$Sb_2O_3 + 3Na_2SO_4 + nSiO_2 + 6C = Sb_2S_3 + 3(Na_2O \cdot nSiO_2) + 6CO_2 \tag{6}$$

or

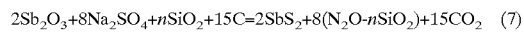
$$2Sb_2O_3 + 8Na_2SO_4 + nSiO_2 + 15C = 2SbS_2 + 8(N_2O \cdot nSiO_2) + 15CO_2 \tag{7}$$

However, with respect to $Na_2SO_4$, not only the reactions described above but also the reactions:

$$Na_2SO_4 + 2C = Na_2S + 2CO_2 \quad (8)$$

$$Fe_2O_3 + 2Na_2SO_4 + nSiO_2 + 4C = 2FeS + 2(Na_2O\text{-}nSiO_2) + 4CO_2 \quad (9)$$

$$2Fe_2O_3 + 8Na_2SO_4 + nSiO_2 + 17C = 4NaFeS_2 + 4(Na_2O\text{-}nSiO_2) + 17CO_2 \quad (10)$$

may take place.

In addition to the reactions described above, sulfur becomes sulfur gas and escapes from the glass. As a minor reaction, a reaction of $S + O_2 \rightarrow SO_2$ also occurs.

As described above, $Fe_2O_3$ is present in a trace amount in silica sand as the raw material for $SiO_2$.

As a result of the reactions described above taking place, the glass and the glass tube usually exhibits pale yellow to yellow colors.

Then, the glass tube is formed into a bulb shape and, without allowing the bulb to cool significantly, a re-heating treatment is conducted for coloration. The bulb shape means a shape comprising a tubular portion, with one end formed of a semi-spherical portion and the other end being opened. The semi-spherical portion may be formed into a desired shape by a mold.

As preferred conditions for the re-heating treatment, in a case of red coloration, the bulb is heated at 650 to 700° C. for 3 min to 30 min and then rapidly cooled by being left at a normal temperature. Further, in a case of orange coloration, the bulb is heated at 680 to 700° C. for about 1 to 3 min and then lowered to about normal temperature for 3 to 10 sec per 1° C. (about 0.5 to 1.5 hours). By the treatments, a colloid comprising $SbS_2$ and/or $Sb_2S_3$ is formed in the glass. The grain size of the colloid changes depending on the difference in the conditions for the re-heating treatment described above to obtain orange-red colored glass bulbs having a transmission or permeation limit wavelength of 550 to 650 nm.

Further, in a case when a red colored glass bulb is used and formed into an electric lamp, the tone sometimes becomes slightly pale because a flame for forming the lamp contacts the bulb (intermediate color between red and orange—red orange color specified in IEC standards, JIS etc). In this case, the tone can be restored again to the red color by heating the electric lamp itself to a temperature lower than the temperature for the re-heating treatment, preferably, 550 to 600° C. for about 2 to 3 min as an additional re-heating treatment. When the step (heating at 550 to 600° C. for about 2 to 3 min) is added after red coloration in the bulbs, stable and flawless red bulbs can be obtained more easily.

The thus obtained colored lighting glass bulb of this invention which is colored orange to red has a chromaticity within the range for the chromaticity standards of automobile lamps specified according to Japanese Industrial Standards (JIS) as: $y \leq 0.335$, $z \leq 0.008$ for the red color and $0.398 \leq y \leq 0.429$, $z \leq 0.007$ for the orange (yellowish red) color, in which y and z represent chromaticity coordinates according to JIS Z 8701 which is a method of specifying colors expressed as $z = 1 - x - y$. The chromaticity standards for automobile lamps specified in Japanese Industrial Standards (JIS) also conform with the standards of the International Electric Standard Conference (IEC) and is within the range of the standards of the Society of Automotive Engineers (SAE).

EXAMPLES OF THE INVENTION

The present invention is described below specifically with reference to Preparation Examples and Examples.

Preparation Example 1

Each of the samples for the glass materials used for the following examples: CA-10, CA-11, CA-15, CA-14, CA-12, CA-13, CA-10b, CA-19, CA-17, CA-18, CA-19, CA-19b, CA-19a, CA-22 (No. 1–No. 25) was manufactured as described below.

At first, a glass material was prepared from a basic composition, on a wt % basis, of $SiO_2$: 71.6%, $Al_2O_3$: 1.77%, CaO: 8.30%, $Na_2O$: 16.5%, $K_2O$: 1.10%, $TiO_2$: 0.70% and $Fe_2O_3$: 0.03%, and minor amounts of $Sb_2O_3$ and S such that the analytical values of $Sb_2O_3$ and $SO_3$ (wt %) of the glass material after being molded as a glass tube were as shown in the table, by melting in a crucible having a melting capacity of about 50 kg and then molding by hand drawing into a tubular shape of 15 mm outer diameter, 0.9 mm thickness and 1520 mm overall length as a material for an S-25 type electric lamp bulb and into a tubular shape of 20 mm outer diameter, 0.8 mm thickness and 1450 mm overall length as a material for a T20 wedge electric lamp bulb.

As the raw material for $SO_3$ sulfur (S) or sodium sulfide ($Na_2SO_4$) was used as described in the table; as the raw material for Sb, $Sb_2O_3$ was used; and materials generally used on an industrial scale were used for other ingredients. Further, as the analysis method for obtaining analytical values of $Sb_2O_3$ and $SO_3$ after being molded into a glass tube, the analysis method for soda lime glass according to JIS R 3101 was used for $SO_3$ and $Sb_2O_3$ was measured by atomic absorption photometry. The melting temperature in the table means the atmospheric temperature of the furnace for melting the starting materials.

In a case of molding the bulbs (S-25) for the S-25 type electric lamps in each of the tables, molded glass tubes were used and, after molding them in a vertical vacuum type bulb-forming machine using a mold, a bulb distortion treatment was applied. Since the bulb was melted once at a die-molded portion, it showed coloration somewhat but exhibited flaws or not-colored portions. On the other hand, in a case of molding bulbs (T20W) for T20 wedge electric lamps, the molded glass tubes were cut each into an optional length, formed into a semi-spherical shape only at the head in a lateral bulb-forming machine to mold a bulb and then a distortion treatment was applied. The bulb included a portion which is not heat treated during formation of the bulb.

Subsequently, a re-heating treatment was directly applied by a batch type electric furnace to obtain various kinds of bulb samples.

The conditions such as temperature setting and re-heating treatment time in the electric furnace are shown in each of the tables. The re-heating treatment was conducted by a method of charging a bulb into a furnace just after the temperature of the electric furnace reached a predetermined temperature and then leaving the bulb from the instant it was charged up to a predetermined time. Accordingly, the temperature in the electric furnace was maintained about at the setting temperature ±15° C., while this depended on the performance of the electric furnace.

For the cooling method in each of the tables, rapid cooling means a method of taking out a bulb to which the heat treatment was applied for a predetermined period of time and then cooling it at normal temperature, while gradual cooling means a method of lowering the temperature at 3 to 10 sec per 1° C. after the predetermined heat treatment in the furnace.

In each of the tables, the tone was measured by observing the color of the resultant bulb, measuring the chromaticity using a calorimeter (CL-100, manufactured by Minolta Co.), locating a T10W Krypton gas-incorporated electric lamp (12V5W) at a position 15 cm from a light receiving surface of a measuring instrument in a dark room, capping the bulb to the electric lamp so as to be situated at a predetermined position and expressing by x, y coordinate values of the XYZ chromatic system measured 3 min thereafter. The illuminance was based on a transmission light speed as "100" when measured by capping a transparent bulb for an S-25 type electric lamp.

Example 1

The glass materials described in the following Table 1 were mixed in a predetermined amount, to obtain colored glass bulbs in accordance with Preparation Example 1 containing the amounts of $Sb_2O_3$ and $SO_3$ identified in the table. The results are shown in the table.

for the red to orange coloration. Further, it shows that the content for both of them should exceed the lower limit in the glass (Sb: 0.3 wt % or more and S: 0.5 wt % or more) (Sample Nos. 1, 2 and 3)

Since Sample No. 6 was a colorless transparent glass, chromaticity was not measured.

Example 2

In the same manner as in Example 1, the materials described in Table 2 were mixed, and after melting the glass to mold glass tubes, the tubes were formed into a bulb shape and then re-heated and cooled to obtain colored glass bulbs. The glass contained the amounts of $Sb_2O_3$ and $SO_3$ identified in the table.

TABLE 1

| Sample (bulb shape) | 1<br>S-25 | 2<br>S-25 | 3<br>S-25 | 4<br>S-25 | 5<br>S-25 | 6<br>S-25 | 7<br>S-25 |
|---|---|---|---|---|---|---|---|
| Composition No. | CA-10 | CA-11 | CA-15 | CA-14 | CA-12 | CA-13 | CA-10b |
| $Sb_2O_3$ | 0.47 | 0.47 | 0.38 | 0.38 | 0.36 | 0.22 | 0.29 |
| $SO_3$ | 0.76 | 0.54 | 0.68 | 0.49 | 0.39 | 0.22 | 0.64 |
| (Material name) | S | S | S | S | S | S | S |
| Melting temperature [° C.] | 1350 | 1350 | 1350 | 1350 | 1350 | 1350 | 1350 |
| Re-heating temperature [° C.] | 680 | 680 | 680 | 680 | 680 | 680 | 680 |
| Re-heating time [min] | 5 | 5 | 5 | 5 | 5 | 5 | 5 |
| Cooling method | rapid cooling | rapid cooling | rapid cooling | rapid cooling | rapid cooling | rapid cooling | rapid cooling |
| Bulb tone | Red | Red-orange | Orange | Yellow | Pale yellow | Colorless transparent | Pale yellow |
| Chromaticity: x coordinate | 0.673 | 0.646 | 0.595 | 0.519 | 0.484 | — | 0.485 |
| Chromaticity y coordinate | 0.326 | 0.353 | 0.398 | 0.424 | 0.417 | — | 0.414 |
| Illuminance | 12 | 26 | 42 | 72 | 85 | — | 88 |

Table 1 shows the differences in bulb coloration due to the differences of the $Sb_2O_3$ and $SO_3$ contents. Not only the Sb content expressed in terms of $Sb_2O_3$ but also the S content expressed in terms of $SO_3$ have a required minimum content

TABLE 2

| Sample (bulb shape) | 1<br>S-25 | 8<br>T20W | 9<br>T20W | 10<br>T20W | 11<br>T20W | 12<br>T20W | 13<br>S-25 |
|---|---|---|---|---|---|---|---|
| Composition No. | CA-10 | CA-10 | CA-19 | CA-17 | CA-18 | CA-19b | CA-19 |
| $Sb_2O_3$ | 0.47 | 0.47 | 0.42 | 0.34 | 0.36 | 0.48 | 0.42 |
| $SO_3$ | 0.76 | 0.76 | 0.69 | 0.77 | 0.59 | 0.27 | 0.69 |
| (Material name) | S | S | $Na_2So_4$ | $Na_2So_4$ | $Na_2So_4$ | $Na_2So_4$ | $Na_2So_4$ |
| Melting temperature [° C.] | 1350 | 1350 | 1350 | 1350 | 1350 | 1350 | 1350 |
| Re-heating temperature [° C.] | 680 | 700 | 700 | 700 | 700 | 700 | 680 |
| Re-heating time [min] | 5 | 3 | 3 | 3 | 3 | 3 | 5 |
| Cooling method | rapid cooling | rapid cooling | rapid cooling | rapid cooling | rapid cooling | rapid cooling | rapid cooling |
| Bulb tone | Red | Red | Red | Orange | Red-orange | Substantially colorless | Red |
| Chromaticity: x coordinate | 0.673 | 0.679 | 0.683 | 0.581 | 0.638 | 0.481 | 0.673 |

TABLE 2-continued

| Sample (bulb shape) | 1 S-25 | 8 T20W | 9 T20W | 10 T20W | 11 T20W | 12 T20W | 13 S-25 |
|---|---|---|---|---|---|---|---|
| Chromaticity y coordinate | 0.326 | 0.320 | 0.315 | 0.407 | 0.359 | 0.418 | 0.326 |
| Illuminance | 12 | 11 | 13 | 47 | 30 | 89 | 14 |

Table 2 shows the change of coloration (i.e., developed color) of the bulbs when the shape of the bulbs and the material source for $SO_3$ are changed. The thickness of the S-25 type bulb (Sample No. 1 and Sample No. 13) was about 0.5±0.2 mm and the thickness of the T20W type bulb (Sample No. 8–No. 12) was 0.85±0.1 mm. The difference of thickness occurs because of differences in the methods of forming the bulbs. The S-25 type bulb is easily deformed by the re-heating treatment because the S-25 type bulb is thinner than the T20W type bulb. Therefore, lower temperature and a longer treatment period were used for the re-heating treatment of the S-25 type bulb.

From the results shown in Table 2, it is apparent that even when the materials for coloration are changed (Sample No. 1 and No. 13 and Sample No. 8 and No. 9) or even when the bulb shape is changed (Sample No. 1 and No. 8 and Sample No. 9 and No. 13), it has no effect on the coloration so long as the Sb content calculated as $Sb_2O_3$ and the S content calculated as $SO_3$ in the glass are within the range of the invention and the change of the glass thickness, providing that it is about 0.3 to 1.0 mm, can be coped with by changing the conditions for coloration.

Example 3

In the same manner as in Example 1, the materials described in Table 3 were mixed and, after melting the glass to mold glass tubes, the tubes were formed into a bulb shape and then re-heated and cooled to obtain colored glass bulbs. The glass contained the amounts of $Sb_2O_3$ and $SO_3$ identified in the table.

Sample No. 14 was formed into a bulb shape without applying re-heating and cooling.

TABLE 3

| Sample (bulb shape) | 14 T20W | 9 T20W | 15 T20W | 16 T20W | 17 T20W | 18 T20W | 19 T20W |
|---|---|---|---|---|---|---|---|
| Composition No. | CA-19 | CA-19 | CA-19 | CA-19a | CA-19a | CA-10b | CA-10b |
| $Sb_2O_3$ | 0.42 | 0.42 | 0.42 | 0.56 | 0.56 | 0.29 | 0.29 |
| $SO_3$ | 0.69 | 0.69 | 0.69 | 0.45 | 0.45 | 0.64 | 0.64 |
| (Material name) | $Na_2SO_4$ | $Na_2SO_4$ | $Na_2SO_4$ | $Na_2SO_4$ | $Na_2SO_4$ | S | S |
| Melting temperature [° C.] | 1350 | 1350 | 1350 | 1450 | 1450 | 1350 | 1350 |
| Re-heating temperature [° C.] | — | 700 | 650 | 700 | 650 | 700 | 650 |
| Re-heating time [min] | — | 3 | 300 | 3 | 300 | 3 | 300 |
| Cooling method | — | rapid cooling | rapid cooling | rapid cooling | rapid cooling | rapid cooling | rapid cooling |
| Bulb tone | Yellow | Red | Red | Yellow | Red-orange | Pale yellow | Yellow |
| Chromaticity: x coordinate | 0.529 | 0.683 | 0.696 | 0.531 | 0.650 | 0.485 | 0.519 |
| Chromaticity y coordinate | 0.420 | 0.315 | 0.303 | 0.420 | 0.348 | 0.414 | 0.424 |
| Illuminance | 72 | 13 | 7 | 66 | 16 | 88 | 72 |

Table 3 shows the effect of variations of the amount of $Sb_2O_3$ and $SO_3$ and change of time of the coloring treatment. When the Sb content calculated as $Sb_2O_3$ is less than 0.3% by weight and the S content calculated as $SO_3$ is less than 0.5% by weight, the glass develops a light color if it is treated longer, but the color is not sufficient (compare Sample Nos. 16 and 17 and Nos. 18 and 19). When a bulb is treated for 300 min., a lower temperature, i.e., 650° C. is used to avoid deformation of the bulb.

When a bulb which was prepared using the same materials as a bulb that developed a red color by a re-heating treatment at 700° C. for 3 min. was re-heated at 650° C. for 300 min., there was no color difference (compare Sample Nos. 9 and 15).

Example 4

In the same manner as in Example 1, the materials described in Table 4 were mixed and, after melting the glass and molding it into glass tubes, the tubes were formed into a bulb shape and heated and cooled to obtain colored lighting glass bulbs. The glass contained the amounts of $Sb_2O_3$ and $SO_3$ identified in the table. Further, the T20W electric lamp in the table is a T20W wedge lamp prepared by using a colored glass bulb of Sample No. 10 and it shows results for the tone and the chromaticity for a bulb formed in a state where a flame was in contact with the colored glass bulb portion upon formation of the electric lamp (Sample No. 23) and an electric lamp applied with an additional re-heating treatment (heating at 550 to 600° C. for about 2 to 3 min) to the electric lamp (Sample No. 24) upon manufacture.

Amber shows an S-25 type bulb manufactured by General Electric (GE) Co. (USA) described in JIS by using cadmium—selenium colored glass.

"Transparent" shows a colorless transparent bulb for use in the S-25 type electric lamp manufactured with soda lime glass.

TABLE 4

| Sample (bulb shape) | 8 T20W | 20 T20W | 21 T20W | 22 T20W | 23 T20W | 24 T20W |
|---|---|---|---|---|---|---|
| Composition No. | CA-10 | CA-10 | CA-22 | CA-22 | CA-10 | CA-10 |
| $Sb_2O_3$ | 0.47 | 0.47 | 0.69 | 0.69 | 0.47 | 0.47 |
| $SO_3$ | 0.76 | 0.76 | 0.75 | 0.75 | 0.76 | 0.76 |
| (Material name) | S | S | $Na_2SO_4$ | $Na_2SO_4$ | S | S |
| Melting temperature [° C.] | 1350 | 1350 | 1350 | 1350 | — | — |
| Re-heating temperature [° C.] | 700 | 700 | 700 | 700 | — | — |
| Re-heating time [min] | 3 | 3 | 3 | 3 | — | — |
| Cooling method | rapid cooling | gradual cooling | rapid cooling | gradual cooling | — | — |
| Additional re-heating temperature [° C.] | — | — | — | — | — | 570 |
| Cooling method | — | — | — | — | — | gradual cooling |
| Bulb tone | Red | Orange | Red | Red | Red-orange | Red |
| Chromaticity: x coordinate | 0.670 | 0.591 | 0.698 | 0.701 | 0.631 | 0.676 |
| Chromaticity: y coordinate | 0.328 | 0.406 | 0.301 | 0.300 | 0.367 | 0.322 |
| Illuminance | 17 | 62 | 7 | 7 | — | — |

Table 4 shows how the color of the obtained colored glass bulb is effected by the method of cooling following the re-heating treatment (compare Sample Nos. 8 and 20). The content of each of $Sb_2O_3$ and $SO_3$ was also varied to confirm whether the same results were obtained (compare Sample Nos. 21 and 22). Referring to the results for Sample Nos. 8 and 20, it is seen that bulbs having two different color tones were obtained using different methods of cooling. Referring to the results for Sample Nos. 21 and 22, bulbs having the same color tone were obtained using different cooling methods.

Sample No. 23 shows that the red color tone of the bulb (Sample No. 8) changed to a red orange color tone during formation of the lamp because a flame contacted the bulb during the process of forming the lamp. However, the red color tone of the bulb was restored by an additional re-heating treatment of the lamp (Sample No. 24).

Comparative Example 1

As Comparative Example 1, a coated product was prepared by coating a coating material formed by mixing a red pigment with a binder to the outer surface of a glass portion of the T20 wedge lamp using a colorless transparent glass bulb.

TABLE 5

| Sample (bulb shape) | 25 T20W | 26 S-25 | 27 S-25 |
|---|---|---|---|
| Composition No. | Coated product | Amber | Transparent |
| $Sb_2O_3$ | | | |
| $SO_3$ | — | — | — |
| (Material name) | | | |
| Melting temperature [° C.] | — | — | — |
| Re-heating temperature [° C.] | — | — | — |
| Re-heating time [min] | — | — | — |
| Cooling method | — | — | — |
| Cooling method | — | — | — |
| Bulb tone | Red | Orange | Colorless transparent |
| Chromaticity: x coordinate | 0.686 | 0.584 | 0.472 |
| Chromaticity: y coordinate | 0.292 | 0.414 | 0.410 |
| Illuminance | 30 | 74 | 100 |

As apparent from Tables 1 to 4 described above, the tones for Samples No. 1, No. 8, No. 9, No. 15, No. 21, and No. 22 are within the range of red standards for automobile electric lamps specified, for example, according to the standards of the International Electric Standard Conference (IEC) or Japanese Industrial Standards (JIS), and the Specimens No. 3 and No. 20 are within the range of orange (yellow red) color for automobile electric lamps in the same manner.

Further, the illuminance is in proportion with the chromaticity, which is lowered to about 15% in a case where the chromaticity is pale and to about 10% in a case where the chromaticity is dense in order to satisfy the red color specified according to JIS standards. However, the low illuminance can be improved by a change of the filament design or gas jetted into the bulb of the electric lamp.

Further, Sample No. 20 can be obtained from the identical material as that in Specimen No. 1 by a change of the coloration method and can be replaced for the existing product (Sample No. 26) with no disadvantage. The difference between both the chromaticity and the illuminance is within the range of tolerance for identical products.

EFFECTS OF THE INVENTION

Since the lighting glass according to this invention contains no deleterious ingredients such as lead, cadmium, selenium, chromium and arsenic, it is excellent from an environmental point of view. In addition, since it can be colored to red-orange by heat treatment, a single material can be used suitably for glass bulbs for direction indicator lamps and tail/stop lamps of automobiles and the like.

Further, the transmission light in the colored glass bulb according to this invention is within the range of predetermined chromaticity (orange or red) for automobile electric lamps as specified in accordance with the standards of the International Electric Standard Conference (IEC) or Japanese Industrial Standards (JIS) and can be adopted as direction indicator lamps and tail/stop lamps, for example, of automobiles.

Further, according to the method of manufacturing the lighting glass and the colored glass bulb according to this invention, colored glass bulbs can be prepared easily in a short period of time.

What is claimed is:

1. A lighting glass comprising 0.3 to 1.0% by weight of Sb calculated as $Sb_2O_3$ and 0.5 to 1.0% by weight of S calculated as $SO_3$ contained in an $SiO_2$—$Al_2O_3$—$R^1O$—$R^2{}_2O$-based glass, where $R^1$ represents Ca, Sr, Mg and Ba and $R^2$ represents Na, K and Li, and where the Sb and S are present in the glass in the form of a colloid comprising $SbS_2$ and/or $Sb_2S_3$.

2. A lighting glass as recited in claim 1, wherein the $SiO_2$—$Al_2O_3$—$R^1O$—$R^2{}_2O$-based glass, where $R^1$ represents Ca, Sr, Mg and Ba and $R^2$ represents Na, K and Li, has a composition comprising on a weight % basis, $SiO_2$: 60 to 75%, $Al_2O_3$: 1 to 5%, $B_2O_3$: 0 to 3%, BaO: 0 to 10%, SrO: 0 to 12%, CaO: 0 to 18%, MgO: 0 to 5%, $Na_2O$: 1 to 17%, $K_2O$: 1 to 17% and $Li_2O$: 0 to 3%.

3. A colored glass bulb comprising the lighting glass recited in claim 1 or 2.

4. A method of manufacturing lighting glass of claim 1 comprising providing an $SiO_2$—$Al_2O_3$—$R^1O$—$R^2{}_2O$-based glass, where $R^1$ represents Ca, Sr, Mg and Ba and $R^2$ represents Na, K and Li, containing 0.3 to 1.0% by weight of Sb calculated as $Sb_2O_3$ and 0.5 to 1.0% by weight of S calculated as $SO_3$, molding said $SiO_2$—$Al_2O_3$—$R^1O$—$R^2{}_2O$-based glass by heat melting, and applying a re-heating treatment to the molded glass.

5. A method of manufacturing lighting glass as recited in claim 4, wherein the $SiO_2$—$Al_2O_3$—$R^1O$—$R^2{}_2O$-based glass has a composition comprising on a weight % basis, $SiO_2$: 60 to 75%, $Al_2O_3$: 1 to 5%, $B_2O_3$: 0 to 3%, BaO: 0 to 10%, SrO: 0 to 12%, CaO: 0 to 18%, MgO: 0 to 5%, $Na_2O$: 1 to 17%, $K_2O$: 1 to 17% and $Li_2O$: 0 to 3%.

6. A method of manufacturing lighting glass as recited in claim 4 or 5, wherein the re-heating treatment is conducted at a temperature from 650 to 700° C.

7. A method of manufacturing lighting glass as recited in claim 4 or 5, wherein the re-heating treatment is conducted at 650 to 700° C. for 3 to 30 min, and thereafter the glass is rapidly cooled by being left at a normal temperature.

8. A method of manufacturing lighting glass as recited in claim 4 or 5, wherein the re-heating treatment is conducted at 680 to 700° C. for 1 to 3 min, and thereafter the glass is gradually cooled to a normal temperature at a rate of 3 to 10 sec per 1° C.

9. A method of manufacturing lighting glass as recited in claim 4 or 5, wherein after a first re-heating treatment, an additional re-heating treatment is applied to the glass at a temperature lower than the temperature for the first re-heating treatment.

10. A method of manufacturing lighting glass as recited in claim 9, wherein the temperature for the additional re-heating treatment is from 550 to 600° C.

11. A method of manufacturing lighting glass as recited in claim 4 or 5, wherein the lighting glass is a colored glass bulb.

* * * * *